(12) United States Patent
Ackley et al.

(10) Patent No.: US 6,506,234 B1
(45) Date of Patent: Jan. 14, 2003

(54) PRESSURE SWING ADSORPTION GAS SEPARATION METHOD, USING ADSORBENTS WITH HIGH INTRINSIC DIFFUSIVITY AND LOW PRESSURE RATIOS

(75) Inventors: Mark William Ackley, East Aurora, NY (US); James Smolarek, Boston, NY (US); Frederick Wells Leavitt, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/622,889

(22) PCT Filed: Feb. 26, 1999

(86) PCT No.: PCT/US99/04384

§ 371 (c)(1),
(2), (4) Date: Nov. 9, 2000

(87) PCT Pub. No.: WO99/43418

PCT Pub. Date: Sep. 2, 1999

Related U.S. Application Data

(60) Provisional application No. 60/076,263, filed on Feb. 27, 1998.

(51) Int. Cl.[7] .............................................. B01D 53/053
(52) U.S. Cl. ............................... 95/96; 95/130; 95/902; 96/113; 96/114; 96/130; 96/144
(58) Field of Search ....................... 95/96–98, 100–105, 95/130, 902; 96/108, 113, 114, 130, 143, 144

(56) References Cited

U.S. PATENT DOCUMENTS

| 4,859,217 A | 8/1989 | Chao ............................... 55/68 |
| 5,071,449 A | 12/1991 | Sircar ............................. 55/26 |
| 5,074,892 A | 12/1991 | Leavitt ............................ 55/25 |
| 5,122,164 A | 6/1992 | Hirooka et al. .................. 55/26 |
| 5,258,060 A | 11/1993 | Gaffney et al. ................ 95/101 |
| 5,518,526 A | 5/1996 | Baksh et al. ................... 95/103 |
| 5,672,195 A | 9/1997 | Moreau et al. ................. 95/96 |
| 5,711,787 A | 1/1998 | Neill et al. ...................... 95/96 |
| 5,716,427 A | 2/1998 | Andreani et al. ............... 95/90 |
| 5,769,928 A | 6/1998 | Leavitt ........................... 95/95 |
| 5,868,818 A | 2/1999 | Ogawa et al. .................. 95/96 |
| 5,891,218 A | 4/1999 | Rouge et al. ................... 95/96 |
| 6,010,555 A | 1/2000 | Smolarek et al. ............... 95/98 |

FOREIGN PATENT DOCUMENTS

GB 2091121 A 7/1982

OTHER PUBLICATIONS

Smolarek, et al., Advanced PSA Oxygen Production;, *Gas Separation Technology*, 1990.

Kumar, "Vacuum Swing Adsorption Process for Oxygen Production—A Historical Perspective," Sep. Sci. Technology, 31:877–893, 1996.

Kayser and Knaebel, "Pressure Swing Adsorption: Experimental Study Of An Equilibrium Theory", Chem. Eng. Sci. 41, 2931, 1986; "Pressure Swing Adsorption: Development Of An Equilibrium Theory For Binary Gas Mixtures With Nonlinear Isotherms", Chem. Eng. Sci. 44, 1, 1989.

Rege and Yang, "Limits for Air Separation by Adsorption with LiX Zeolite", Ind. Eng. Chem. Res., 36: 5358–5365, 1997.

Reiss, "Oxygen enrichment of air with the aid of molecular sieve zeolites", Chem. Ind. XXXV, p689, 1983.

*Primary Examiner*—Robert H. Spitzer
(74) *Attorney, Agent, or Firm*—Robert J. Follett

(57) ABSTRACT

A gas separation process incorporating the invention combines use of an adsorbent having high intrinsic diffusivity with a low pressure ratio PSA cycle. Further enhancements to the process are derived from the use of fast cycles, shallow beds and small particles—especially in a radial bed configuration. The combination of low pressure ratio, high rate adsorbents and fast cycles has been found to result in an unexpected simultaneous reduction in bed size factor (BSF) and power consumption. These benefits have been achieved while minimizing a decline in product recovery through use of the high rate adsorbent. The net result is a significant reduction in product cost.

24 Claims, 3 Drawing Sheets

PRESSURE SWING ADSORPTION GAS
SEPARATION METHOD, USING
ADSORBENTS WITH HIGH INTRINSIC
DIFFUSIVITY AND LOW PRESSURE RATIOS

This application claims benefit of application Ser. No. 60/076,263 filed Feb. 27, 1998.

FIELD OF THE INVENTION

This invention relates to pressure swing adsorption (PSA) and vacuum pressure swing adsorption (VPSA) methods for gas separation, and more particularly to a method for air separation wherein the cost for the $O_2$ product is reduced by use of a process which employs low pressure ratios and uses adsorbents exhibiting high intrinsic diffusivity.

BACKGROUND OF THE INVENTION

Significant developments of the vacuum swing adsorption (VSA), PSA and VPSA methods for gas separation have taken place over the past thirty years, with major advances occurring during the last decade. Such processes have also been named subatmospheric, superatmospheric, and transatmospheric, respectively. Unless specifically otherwise noted, PSA will be used below to mean any or all of these processes. Commercalization of these processes can be attributed to improvements in the adsorbents, process cycles and advances in adsorber design.

Highly exchanged lithium molecular sieve adsorbents, as illustrated by Chao in U.S. Pat. No. 4,859,217, are representative of advanced adsorbents for $O_2$ production. Such advanced adsorbents are expensive and represent a significant portion of the capital cost of PSA equipment.

A dominant factor in the total energy requirement of PSA processes is the ratio of adsorption to desorption pressures. Lowering the pressure ratio is a potential method of reducing power consumption. Furthermore, a reduction in PSA cycle time has the potential to reduce the amount of adsorbent required. Unfortunately, the usual consequence of both of these strategies is a reduced product (e.g., $O_2$) recovery. Attempts to operate at lower pressure ratios have been accompanied by substantial decreases in adsorbent productivity, e.g. Leavitt, U.S. Pat. No. 5,074,892.

Smolarek, in copending U.S. patent application Ser. No. 08/964,2293, now U.S. Pat. No. 6,010,555, overcomes some of the offsetting effects of low pressure ratio through appropriate selection and operation of vacuum and compression machinery, combined with the improved flow characteristics of radial flow adsorbers. Ackley, et al. in copending U.S. patent application Ser. No. 09/622,961, have taught the maximizing of product recovery and adsorbent productivity through the use of high intrinsic diffusivity absorbents in fast cycles.

While the invention to be described below is applicable to a wide range of gas separations, PSA air separation processes aimed at the production of high purity $O_2$ (approximately 88% to 95.7% $O_2$) are of particular interest. Air separation prior art discussed below reflect this $O_2$ purity range.

Advanced adsorbents of the types mentioned above are the result of improvements in equilibrium properties. Improved $N_2$ working capacity and $N_2/O_2$ selectivity of adsorbents have been transformed into large gains in process efficiency—such benefits being obtained at the expense of higher adsorbent cost (Smolarek, et al., *Gas Separation Technology*, 1990). Lithium-exchanged zeolite adsorbents (LiX), in particular, have had a major impact upon the evolution of PSA air separation processes. The higher $N_2$ capacity and higher $N_2/O_2$ selectivity resulting from highly-exchanged LiX zeolites of low $SiO_2/Al_2O_3$ ratio have been more recently exploited for higher performance in air separation PSA processes. Other major improvements to these processes have been the introduction of vacuum for desorption, reduction from three-bed and four-bed processes to two bed cycles, and the use of modified cycle steps such as product pressurization, purge and/or equalization. These and other prior art advances in oxygen production have been summarized by Kumar ("Vacuum Swing Adsorption Process for Oxygen Production—A Historical Perspective," Sep. Sci. Technology, 31: 877–893, 1996).

Improving process efficiency and reducing the cost of the light component product can be accomplished by decreasing the amount of adsorbent required per unit of product (increasing adsorbent productivity) and by increasing the product recovery. The former is generally expressed in terms of bed size factor (BSF) in lbs adsorbent/TPDO (ton per day of contained $O_2$), while the latter is simply the fraction of light component in the feed that is captured as product. Improvement in adsorbents and reduction in cycle time are two primary methods of reducing BSF.

Considerable prior art attention has been focused upon process optimization. Reiss (Chem. Ind. XXXV, p689, 1983) emphasizes the importance of adsorbent qualities and high $O_2$ product recovery upon energy consumption in vacuum processes (VSA) for the oxygen enrichment of air. Reiss has shown that there is a minimum in the specific vacuum pump power characteristic as the desorption pressure is increased for a fixed adsorption pressure. More specifically, power per unit of $O_2$ produced initially decreases with decreasing pressure ratio and then increases such that there is an optimum pressure ratio for minimum specific power consumption. Concurrent to the effect of decreasing pressure ratio upon specific pump power, is the uniformly decreasing amount of $O_2$ product or a decrease in the adsorbent productivity.

Smolarek, et al. (*Gas Separation Technology*, 1990) achieve the objective of lowering unit $O_2$ product cost by reducing both capital cost and power consumption. Process operating parameters were developed around advanced adsorbent characteristics. Bed size was reduced by using shorter cycles, although the optimum cycle time was selected on the basis of the minimum cost. This minimum cost was established as a compromise between decreasing bed size and decreasing process efficiency as cycle time was shortened. It was also shown that two adsorbent beds was optimum. Lower overall power consumption resulted from the combination of increased $O_2$ product recovery, reduced adsorbent inventory and reduced equipment size. A reduction in the optimum pressure ratio was attributed to the advanced adsorbent. The type of adsorbent (LiX), the BSF (1000 lb/TPDO), and the pressure ratio (6:1), were not originally provided in the publication.

In the prior art, process optimization takes advantage of improved equilibrium adsorbent properties of higher working $N_2$ capacity and higher $N_2/O_2$ selectivity to achieve higher overall product recovery in processes utilizing vacuum desorption. Desorption pressure was increased (pressure ratio decreased) to reduce power consumption. Cycle time was decreased to keep bed size and adsorbent cost in check. Achieving minimum pressure ratio was not a primary objective of the optimization. Indeed, the reduction in pressure ratio was limited by the accompanying increase in bed size and the reduction in product recovery. The lowest pressure ratios corresponding to "optimum performance" achieved in these prior art were 5:1 or higher.

Much of the prior art attends to the incremental improvement in process efficiency through cycle step modification. A good example of such improvements is given by Baksh et al. (U.S. Pat. No. 5,518,526).

The potential benefits of low pressure ratios in achieving lower power consumption have generally been limited, due to the offsetting effects of higher BSF and lower product recovery. Although adsorbents with improved equilibrium properties allow process improvement at lower pressure ratios, reductions below a critical or limiting pressure ratio have a more severe impact upon processes incorporating advanced, high cost adsorbents. In other words, the increased adsorbent inventory accompanying lower pressure ratio has a significant impact upon the capital investment of the plant. Such critical or limiting pressure ratios were defined theoretically by Kayser and Knaebel (Chem. Eng. Sci. 41,2931, 1986; Chem. Eng. Sci. 44,1, 1989) for 5A and 13X adsorbents. The $O_2$ recovery/pressure ratio characteristics are relatively flat at higher pressure ratios (nearly constant recovery), but show a steep decline in recovery below the critical pressure ratio. The critical pressure ratio depends upon the adsorbent type and upon process operating conditions and these limits have not been well defined in practical applications. Nevertheless, the reduced recovery trends have generally discouraged PSA $O_2$ process operation at pressure ratios below about 4:1.

More recently, Rege and Yang (Ind. Eng. Them. Res., 36: 5358–5365, 1997) presented limits for LiX zeolite and revealed an $O_2$ recovery/pressure ratio characteristic for LiX similar to those defined earlier by others for 13X and 5A adsorbents. The theoretical results of Rege and Yang suggest pressure ratios as low as 2:1 with little penalty in $O_2$ recovery for vacuum swing processes. They attribute this performance to the superior equilibrium properties of the adsorbent and indicate the lowest optimum BSF for their cycle to be 18 kg/kg$O_2$ hr (1500 lb/TPDO). Adsorbent bed pressure drop and adsorbent diffusional resistance are neglected in the theoretical model. Power consumption was not considered in the analyses.

Leavitt (U.S. Pat. No. 5,074,892) proposed low pressure ratio $O_2$ production cycles in the range of 1.4 to 4.0 for adsorbents with advanced equilibrium adsorption properties, e.g. LiX, caustic digested NaX. Leavitt's primary motivation was to reduce overall process costs by reducing power consumption. Leavitt noted the importance of high $N_2$ working capacity and high $N_2/O_2$ selectivity of the adsorbent and indicated the need to achieve relatively high product recovery at the low pressure ratios in order to limit the growth in BSF. Larger amounts of purge were suggested at low pressure ratio to partially offset the lower working capacity for $N_2$. While impressive reductions in power consumption were indicated, BSF increased substantially as pressure ratio was decreased. Leavitt did not consider the effect of adsorbent intrinsic diffusivity upon process performance.

Smolarek (in copending U.S. patent application Ser. No. 08/964,293, now U.S. Pat. No. 6,010,555 has proposed a two-bed VPSA $O_2$ cycle using a single-stage vacuum device. The adsorption pressure is in the range of 1.3 to 1.6 atm, while the desorption pressure level is between 0.4 and 0.55 atm. The preferred pressure ratio is in the range of 2.75 to 3.0. A radial flow adsorber is also utilized to provide optimum flow distribution and minimal pressure drop. The higher desorption pressure increases the molar throughput land reduces the pressure differential across the vacuum pump, resulting in the ability to select simplified (single-stage) and less costly vacuum equipment. The lower pressure ratio results in a reduction in product recovery that, in turn, requires a higher feed input for an equivalent amount of product, i.e. compared to a higher pressure ratio cycle. Cycle time is reduced, but is limited in order to avoid introducing additional inefficiencies into the process in order to keep the BSF from increasing significantly. Smolarek claims no increase in BSF compared to the higher pressure ratio reference. The effects of adsorbent properties, high adsorbent rate characteristics in particular, upon process performance have not been addressed in the teachings of Smolarek.

Reducing cycle time is a key strategy to reducing adsorbent inventory and adsorbent cost at any pressure ratio. This is even more important for low pressure ratio cycles. While shorter cycles lead to shorter beds and higher adsorbent utilization, product recovery suffers unless adsorption rate is increased. This phenomena can be ideally characterized in terms of the size of the mass transfer zone (MTZ), i.e. the mass transfer zone becomes an increasing fraction of the adsorbent bed as the bed depth decreases. Since the adsorbent utilization with respect to the heavy gaseous component is much lower in the MTZ than in the equilibrium zone, working capacity declines as this fraction increases. When the resistance to mass transfer is dominated by pore diffusion, a decrease in adsorbent particle size leads to faster rates of adsorption and smaller mass transfer zones. Unfortunately, pressure drop across the adsorbent bed increases with decreasing particle size.

Armond et al. (UK Pat. Appl. GB 2091121A, 1982) demonstrated a short-cycle (<45 s)/low pressure ratio (3.0) air separation process using 5A molecular sieve. This cycle was super-atmospheric, operating with a desorption pressure near ambient. Armond apparently achieved relatively small adsorbent inventory by using very small particles (0.5 to 1.2 mm diameter) to facilitate a short cycle time. However, pressure drop through the bed (48 kPa/m) was quite high as was the power consumption, 0.7 kWhr/sm$^3$ $O_2$ (20 kW/TPDO). The high power consumption was presumably the result of low product recovery.

Ackley et al. in copending U.S. patent application Ser. 09/622,961 have described improved processes utilizing advanced adsorbents with high intrinsic diffusivities relative to conventional adsorbents. Increased $O_2$ product recovery was demonstrated by increasing the rates of adsorption/desorption to create higher $N_2$ mass transfer coefficients at a fixed pressure ratio. This concept was then applied to achieve very short cycles and very low BSF while affecting only minimal decrease in product recovery.

Notaro, et al. in copending U.S. patent application Ser. No. 09/622,867 describe a PSA air separation process, wherein the adsorbent is selected on the basis of related combinations of intrinsic rate and equilibrium properties.

Accordingly, it is a principal object of the invention to reduce product cost, reduce power consumption and increase adsorbent productivity of high performance adsorption processes for the separation of gases.

It is a further object of the invention to provide an improved PSA process for air separation.

SUMMARY OF THE INVENTION

A gas separation process incorporating the invention combines use of an adsorbent having high intrinsic diffusivity with a low pressure ratio PSA cycle. Further enhancements to the process are derived from the use of fast cycles, shallow beds and small particles—especially in a radial bed configuration. The combination of low pressure ratio, high rate adsorbents and fast cycles has been found to result in an unexpected simultaneous reduction in bed size factor (BSF) and power consumption. These benefits have been achieved while minimizing a decline in product recovery through use of the high rate adsorbent. The net result is a significant reduction in product cost.

The high adsorption rate partially offsets the decline in product recovery that accompanies reduced pressure ratio, thus enabling fast cycle operation in shallow beds which affects an unexpected overall decrease in BSF. The present invention couples the effects of mass transfer rates (and the associated particle properties), cycle time and the bed depth to significantly improve gas separation efficiency at low process pressure ratios, i.e. improvements such as an increase in adsorbent productivity (lower BSF) and a decrease in process power consumption.

Both reduced cycle time and reduced pressure ratio cause a decrease in product recovery. This occurs in the former due to the increased fraction of bed devoted to the mass transfer zone and in the latter due to the decrease in selectivity or separation efficiency of the adsorbent. The reduced separation efficiency is substantial in vacuum desorption cycles using advanced adsorbents like LiX and where pressure ratio is commonly reduced by raising the desorption pressure. The application of adsorbents of high intrinsic diffusivity significantly minimizes those undesirable effects during process performance, particularly at low pressure ratios.

While this invention has been demonstrated for the case of air separation, the general methodology applies to other gas phase separations that: (1) depend upon differences in equilibrium adsorption selectivity; and (2) in which the mass transfer resistances are dominated by diffusion in the macropores of the adsorbent particles. The methodology is especially applicable to the production of oxygen in PSA processes incorporating $N_2$-selective adsorbents, e.g. type X zeolites or advanced adsorbents such as highly Li-exchanged type X or other monovalent cation-exchanged zeolites. The invention is particularly well suited to the use of adsorbents having high capacity and high selectivity (in combination with high intrinsic diffusivity) for the most selectively adsorbed (heavy) component of the gas mixture to be separated.

The prior art has focused upon increased $O_2$ product recovery and has exploited lower pressure ratios for lower power consumption only to the extent that was inherently allowed by the improved equilibrium properties of advanced adsorbents. Thus, with each new improvement in adsorbent capacity and selectivity, it was found that reasonable product recovery could be achieved at modestly lower pressure ratio. However, the lower working $N_2$ capacity and shorter cycle time dictated by lower pressure ratios results in lower adsorbent productivity (higher BSF). Prior art attempts to counter this effect by reducing cycle time even further resulted in a rapid deterioration in product recovery—thereby offsetting the lower power benefits of the low pressure ratio as well as limiting the potential gain in adsorbent productivity from the shortened cycle. The use of smaller particles to inhibit loss of product recovery in faster cycles is limited, in that the adsorbent bed pressure drop increases with decreasing particle size, which in turn negatively effects power consumption.

The present invention achieves higher adsorption rate through higher intrinsic diffusivity without requiring the use of very small particles (e.g. the invention preferably uses particles having an average diameter ($d_p$) $\geq 0.8$ mm, more preferably $\geq 1$ mm). However, adsorbent particle size properly selected in accordance with the pore diffusivity can be applied to further enhance the benefits of the new invention.

The invention further focuses upon lowering the product cost. This approach does not demand increased product recovery; rather it demands that the cycle time, bed depth, pressure ratio, flow rate be selected in such a manner as to achieve the lowest product cost. It has been discovered that the potential benefits of low pressure ratio can be more fully exploited by the use of adsorbents modified to have high adsorptive rate (high intrinsic diffusivity), i.e. in contrast to decreasing particle size. And surprisingly, it has been found that adsorbent productivity can be maintained or even increased as pressure ratio is decreased.

DETAILED DESCRIPTION OF THE PREFERRED EMBODIMENT

Figure 1:
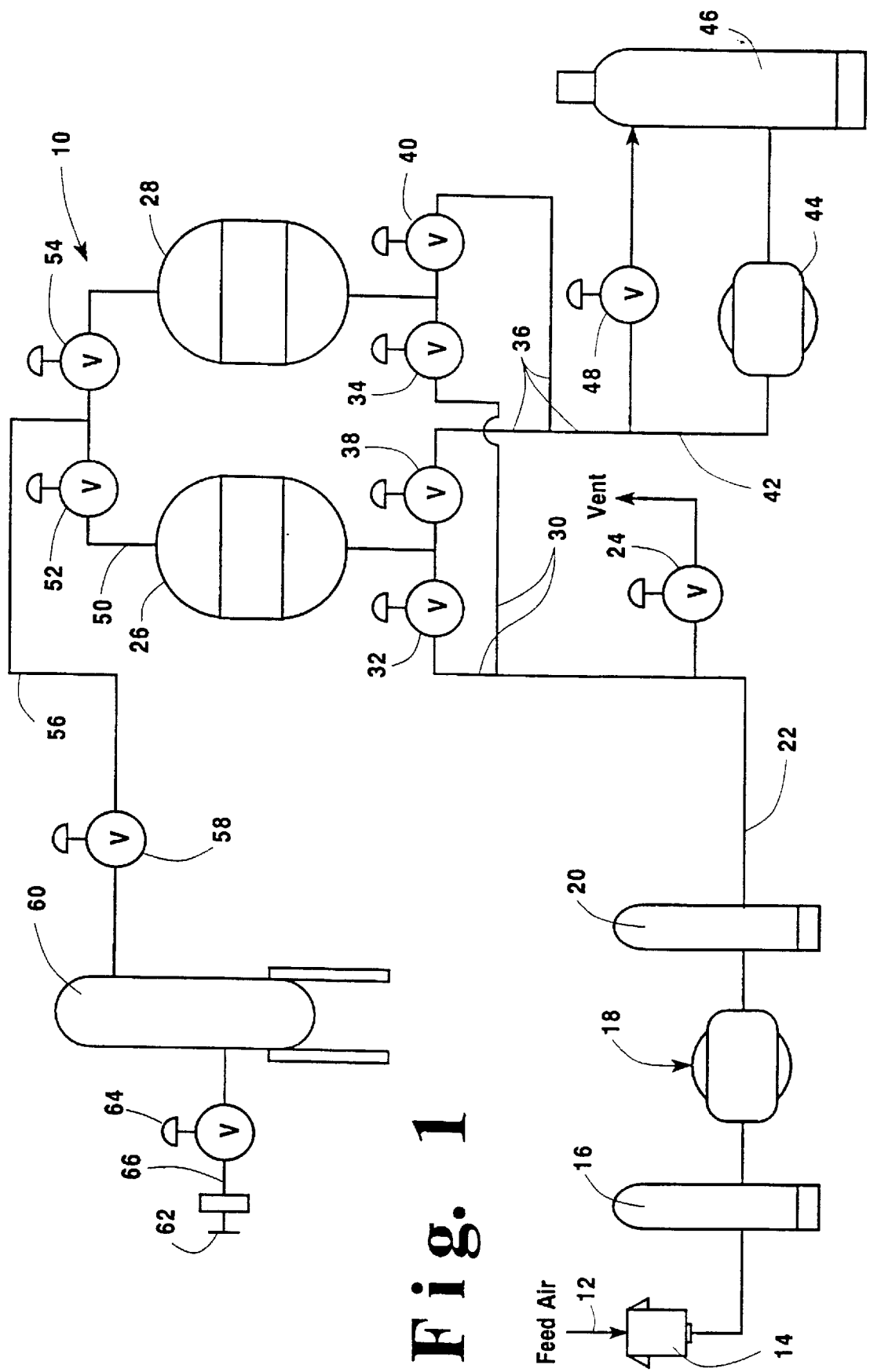
FIG. 1 is a schematic of a VPSA system adapted to perform the invention hereof.

Initially, a description will be given of adsorbents that are preferred for use with a PSA process incorporating the invention. Thereafter, an overall description of the use of the preferred adsorbents in a PSA process will be considered, followed by specific examples of tests that have been run and a detailed description of a PSA system and the process steps that are performed therein.

This invention employs the unexpected results that arise from the combining of low pressure ratio PSA cycles with high adsorbent intrinsic diffusivity. The benefits of the invention may be realized in subatmospheric, transatmospheric and superatmospheric pressure ratio cycles and potentially for any bulk gas separation. The teachings are not limited to advanced absorbents, although the benefits are likely to be most attractive for such high equilibrium performance materials. The benefits of combining low pressure ratio with high adsorbent intrinsic diffusivity, short cycles and shallow beds in PSA air separation are as follows:

• reduced power consumption
• increased adsorbent productivity (reduced BSF)
• reduced vessel size
• equivalent or reduced system pressure drop
• reduced product cost.

The above benefits occur because the integrated effects of the high rate adsorbent used at low pressure ratio with short cycles, shallow beds and simplified compression equipment more than offsets the lower product recovery that accompanies lower pressure ratios. In fact, product recovery may be traded for a lower pressure ratio until a minimum product cost is achieved.

An adsorbent's pore structure may be manipulated through modification of adsorbent processing steps, e.g. zeolite synthesis, ion exchange, calcination, drying, etc. However, zeolite properties are very sensitive to small changes in manufacturing variables and such changes are often damaging to the adsorbent. As a result, zeolite manufacture is subject to rather strict control of process variables.

Commercial zeolite adsorbents shown in Table 1, such as 13XHP, 5AMG, LiX (2.5) and LiX (2.3), available as beads from UOP of Des Plaines, Ill. USA, were all found to have $N_2$ pore diffusivity ($D_p$) in a rather narrow range ($2.6 \times 10^{-6}$ to $3.2 \times 10^{-6}$ m²/s)—as shown in Table 1, where the $N_2$ pore diffusivity is determined from a breakthrough experiment conducted with air at 1.5 bar, 300K. Porosity ($\epsilon_p$) of these same materials falls within the range of 0.30 to 0.38 for conventional zeolites.

TABLE 1

Comparison of Conventional and High Intrinsic Diffusivity Adsorbents

| Designation | Zeolite (SiO$_2$/Al$_2$O$_3$) | $\epsilon_p$ | $d_p$ mm | $D_{P_{N2}}$ m²/s |
|---|---|---|---|---|
| 13X | NaX(2.5) | 0.314 | 2.1 | $3.2 \times 10^{-6}$ |
| 5AMG | NaCaA | 0.315 | 0.7 | $3.1 \times 10^{-6}$ |
| Oxysiv-7 | LiX(2.5) | 0.356 | 0.55 | $2.6 \times 10^{-6}$ |
| N-1A | LiX(2.3) | 0.352 | 1.9 | $2.9 \times 10^{-6}$ |
| Z-0 | LiX(2.0) | 0.345 | 1.6 | $3.0 \times 10^{-6}$ |
| Z-1 | LiX(2.0) c.d. | 0.347 | 2.0 | $5.5 \times 10^{-6}$ |
| Z-2 | LiX(2.0) c.d. | 0.379 | 1.25 | $4.2 \times 10^{-6}$ |

Pore diffusivity = $D_p$
Porosity = $\epsilon_p$
Caustic Digested = c.d.
Particle diameter = $d_p$ Adsorbents with improved intrinsic diffusivity have been produced according to the teachings of Chao in copending U.S. application Ser. No. 09/622,965, herein incorporated by reference. Two such samples (Z-1 and Z-2) are shown in Table 1 and represent a minimum of 30% to 70% improvement in pore diffusivity over that of conventional adsorbents. Sample Z-0 is an advanced LiX (2.0) adsorbent (as described by Chao in U.S. Pat. No. 4,859,217) with conventional pore diffusivity and equilibrium properties and used below in VPSA performance comparisons.

Chao in U.S. patent application Ser. No 09/622,965 has demonstrated various formulations and methods for producing adsorbents with intrinsic diffusivities higher than those of conventional adsorbents. The pore diffusivities of adsorbents can be enhanced by first combining a low amount of binder with zeolite in the bead-forming step, followed by caustic digestion (i.e., "c.d."). The intrinsic rate characteristics of the adsorbent can be improved further by the addition of fiber or submicron latex particulate with subsequent burn-out. Not wanting to be restricted to any one method or formulation, the detailed procedure for producing adsorbent Z-2 of the invention is herein described as one example of making such high rate adsorbents. The method of making Z-2 involves four primary steps of: bead forming, caustic digestion, ion exchange and calcination as described below.

Bead Forming 2640 gm dry weight of NaKX2.0 (wet weight 4190 gm) zeolite, 360 gm dry weight of the ECCA Tex-611 (wet weight 429.1 gm) kaolin clay and 210 gm corn starch were mulled for 15 minutes while water was pumped in at a rate of 10 ml/min. The rate of water addition was then decreased to 4 ml/min for 100 min and the mixture was mulled another 35 min. The mulled mixture was then transferred to a DBY-10R Nauta Mixer (supplied by Hosokawa Micron Powder Systems) and mixed for about one hour. The lumps were broken down to return the mixture to a powder state. Water was then added slowly by an atomizer. As the moisture of the mixture increased, beads started to form. The growth of the beads was stopped by adding dried bonding mix at the point when the highest yield of 8×12 size beads could be harvested.

The beads were dried in air overnight and then calcined in a Blue M oven with a dry air purge. The oven temperature was ramped up to 600° C. in 2 hours then held at 600° C. for 2 hours during the air purge.

Caustic Digestion 1861.8 gm dry weight of calcined NaKX2.0 beads of size 6×16 with 12% binder were used for caustic digestion. To prepare digestion solution, 360 gm of NaOH (9 mole) and 251.1 gm (4.475 mole) KOH was dissolved in 7386 gm of water. To this solution, 320 ml of sacrificial NaKX2.0 beads were added and stirred at 90° C. for 2 hours. The solution was left to settle and 6397.7 gm supernatant was collected. To this supernatant, 1477.2 ml of water, 72.0 gm of NaOH and 50.2 gm of KOH were added to make up for the discarded caustic. The resulting solution was used as digestion solution.

The beads were loaded into two stainless steel columns of 3 inch diameter and the solution from a common reservoir was recycled through each column, at a flow rate of 30 ml/min. and temperature of 88° C. for 26 hours. After digestion the beads were washed by pumping 40 liter of NaOH solution (pH=12, 88° C.) through each column. The beads in each column were further washed with 30 liter NaOH solution (pH=8.5, 88° C.). The product, NaKX2.0CD, was air-dried and screened to various particle size fractions.

Ion Exchange 694.5 gm dry weight of NaKX2.0CD 8×12 beads were loaded into a 3 inch i.d. glass column. A 10 inch layer of 3 mm Pyrex glass beads was placed at the bottom of the column to serve as a preheating zone for the solution. The column was wrapped with a heating tape. The ion exchange solution was first passed through a 15 liter 90° C. preheating flask to partially remove any dissolved air to prevent air bubbles from forming that could be subsequently trapped in the column. The hot solution was then pumped into the bottom of the column.

The ion exchange solution was prepared by dissolving 2162 gm LiCl in 80 liter distilled water (0.64M) then LiOH solution was added to adjust pH of solution to 9. The solution was pumped through the column at the speed of 15 ml/min. until ten to twelve times the stochiometric amount of LiCl, for full Li exchange of the beads, had been circulated through the column. After the ion exchange was completed, the product was washed with 30 liter of 90° C. distilled water at a flow rate of 60 ml/min. The pH of this water was adjusted to 9 by adding LiOH.

Drying and Calcination

The washed product was first air-dried and then dried further in a low temperature oven with ample air purge for 3 hours to bring the moisture of the beads to about 12–15%. The dried beads were calcined in a Blue M oven with ample dry air purge. The oven temperature was ramped from room temperature to 600° C. in two hours and maintained at 600° C. for 40 minutes. The sample was removed from the oven at 450° C. and placed into a tightly sealed glass jar for cooling.

The above procedure was repeated several times in order to produce a sufficient quantity of zeolite for pilot plant testing (approximately 25 lbs.). The various production batches were blended prior to loading into the pilot plant adsorber vessels. Properties of the adsorbent were determined using the blended mixture.

The effective $N_2$ and $O_2$ diffusivity were determined at 1.5 bar and 300K using a combination of breakthrough experiment and detailed modeling, all of which are familiar to one skilled in the art. The effective $O_2$ diffusivity determined for the adsorbents in Table 1 is approximately 35% of the effective $N_2$ diffusivity. PSA improvements in this invention have been correlated to the effective $N_2$ diffusivity. Details of the breakthrough experiment and empirical method for determining diffusivity are provided by Ackley et al. in copending U.S. patent application Ser. No. 09/622,961. In addition to the above-described adsorbents, one skilled in the art will appreciate that alternative adsorbents with increased pore diffusivity can be applied in a manner similar to that described herein to achieve corresponding improvements in process performance.

The terms pore diffusivity, effective diffusivity and intrinsic diffusivity are used interchangeably herein. By the term "intrinsic diffusivity" is meant the transport property that is due to the intrinsic characteristics of the adsorbent particle including, but not limited to the structure, size, shape and length, etc. of the macropores. The term "macropores" is intended to include all of the intra-particle void volume (that volume which establishes porosity) that is typically penetrated in a standard Hg porosimetry test for zeolites. Ideally, a material's intrinsic or effective diffusivity is independent of the particle size.

PSA/ADSORBENT SYSTEM CONSIDERATIONS

Adsorbents may be deployed by this invention in one or more distinct adsorption zones, e.g. pretreatment and main adsorbent zones. One or more adsorbents may be contained in each zone, and the zones do not have to be contained in the same adsorbent vessel. The pretreatment zone is located nearest the feed inlet and its purpose is to remove any undesirable contaminants from the feed stream. Typical contaminants in air separation are water and carbon dioxide. Those skilled in the art will appreciate the use of zeolites, activated alumina, silica gel as well as other appropriate adsorbents in the pretreatment zone. The main adsorbent zone is positioned downstream of the pretreatment zone (relative to the flow through the bed during the adsorption step) and contains adsorbent(s) selective for the primary heavy component(s) in the feed. The pretreatment zone may be excluded if there are no contaminants in the feed stream.

The PSA Processes described herein are those in which the separation of at least two components of a gas phase mixture is affected by differences in equilibrium adsorption capacities of the components in the main adsorbent, i.e. at least one component in the mixture is more selectively adsorbed at equilibrium in comparison to the adsorption of the other components. The invention uses adsorbents that have higher intrinsic diffusion rates than conventional adsorbents.

In equilibrium separations, a gas mixture is passed through a bed of adsorbent particles and the more strongly-adsorbed gas component (heavy) is retained, while the other components (light) emerge from the exit of the adsorber. At the beginning of the adsorption step, a mass transfer zone forms and moves through the bed. Nearly all of the adsorption occurs within this zone. The concentration of the gas to be removed decreases from its concentration in the feed mixture to a very low value over the length of this zone. In some separation processes, this zone quickly reaches a constant length (usually significantly smaller than the overall depth of adsorbent bed) and moves through the bed at a constant speed. If relatively high purity light product is desired, the adsorption step must be stopped (and subsequently followed by a regeneration step) when the front of the zone just begins to erupt at the bed exit. At this instant, the bed contains the mass transfer zone near the exit and the remainder of the bed is fully saturated with the more strongly held component in equilibrium with the feed concentration of this component.

The part of a bed located between the inlet of the main adsorption zone and the rear of the mass transfer zone is known as the "equilibrium zone". If the bed is made shorter than the length of the mass transfer zone, then the component to be removed will break through the bed Immediately at the beginning of the adsorption step. The overall working capacity of the adsorbent for the heavy component is greatest when the fractional size of the mass transfer zone is kept small relative to the total size of the bed, i.e. most of the bed is saturated (equilibrium zone) at the end of the adsorption step. Faster cycles require shorter beds resulting in an increase in the fractional size of the mass transfer zone. The use of adsorbents of high intrinsic diffusivity counters this effect and enables the use of fast cycles while avoiding an increase in the fractional size of the mass transfer zone.

The size of the mass transfer zone is influenced by the particle size and the rate of diffusion of gas into the particle. In many cases, the greatest resistance to this diffusion is in the macropores of the particles, i.e. the gas molecules must travel through the narrow and crooked void passages inside the particle to reach the active surfaces of the adsorbent. If the particle size is reduced, this transfer occurs much more rapidly (since the path length is shortened)—resulting in a shorter mass transfer zone. There are both limitations and disadvantages to this approach as small particles lead to increased pressure drop per unit bed length, difficulty in particle retention in the bed and an increased tendency to fluidize. This approach is further limited in that it ignores the possibility of achieving process performance improvements by increasing intraparticle diffusivity directly without any reduction in particle size.

The pressure drop across the adsorbent mass in a fixed bed adsorber is dependent upon the gas velocity through the bed, the size of particles in the bed, the density of packing of the particles and the bed depth. The relationship amongst these variables is established by the well-known Ergun Equation (Chem. Engng. Progress, 1952), which is widely used to determine the pressure loss across a fixed adsorbent bed. Simply, the pressure drop increases for smaller particles, deeper beds, higher gas flows and a denser packing.

While the particular adsorber depends upon the characteristics of the separation to be performed, adsorbent bed pressure-drop less than or equal to 0.25 psi/ft (56 mbar/m) and bed depths of 4.0 ft (1.2 m) to 6.0 ft (1.8 m) have been quite common in $O_2$ production, using $N_2$-selective adsorbents, as well as in other conventional PSA processes. To compensate for the higher pressure drops resulting from reduced particle size, and to minimize the increase in power and tendency to fluidize, it is necessary to decrease the bed depth and/or the flow velocity through the bed. These changes lead to a reduced recovery and trade-off in bed utilization for a fixed particle size, i.e. shorter beds necessitate faster cycles leading to reduced recovery and possibly some improvement in bed utilization, although reduced velocity counters this increase in bed utilization (for a fixed inlet area) due to the resulting lower feed throughput.

Although this latter problem can be countered by increasing the flow area, there are practical limits to the size of adsorber vessels—particularly in the case of conventional cylindrical, packed adsorbers with axial flow.

Ackley et al. (copending application U.S. Ser. No. 09/622,961 is hereafter incorporated in its entirety by reference, and teaches a method to improve VPSA process efficiency (maximize product recovery) and to reduce product cost at a moderate pressure ratio (5:1), using fast cycles and shallow beds. The Ackley et al. method is practiced using high mass transfer rates achieved with modified adsorbents with high intrinsic pore diffusivity. Examples of such adsorbents are defined by Chao as described in copending U.S. application Ser. No. 09/622,965, the contents of which are incorporated herein by reference.

Particle size may also be selected in combination with high intrinsic diffusivity to tailor mass transfer rates for high product recovery. While this guidance applies to any process pressure ratio, Ackley et al. do not teach the integration of these concepts with low pressure ratio. In particular, there is no indication that reducing pressure ratio could be achieved in conjunction with these teachings without suffering the usual expected loss in adsorbent productivity.

Smolarek, copending application Ser. No 08/964291, now U.S. Pat. No. 6,010,555, the contents of which are incorporated herein by reference), teaches the importance of the desorption pressure level, bed flow and pressure drop and the use of simplified vacuum equipment in minimizing the drop in product recovery accompanying low process pressure ratio. This integration of simplified equipment and low pressure ratio leads to reduced product cost. Smolarek also notes the limitations of reducing cycle time without "engendering additional inefficiencies . . ." in the process. Smolarek teaches no particular adsorbents nor high rate adsorbents.

EXAMPLES

VPSA Performance Comparisons—$O_2$ Production

A series of pilot plant tests were performed with adsorbents Z-0 and Z-2 (described in Table 1 above) to demonstrate the benefits of the invention for VPSA air separation. The adsorption pressure was maintained at about 1.5 bar in all tests, while the desorption pressure was varied to achieve pressure ratios of approximately 5.1, 3.3 and 2.6. Note that the term "pressure ratio" defines the ratio of the adsorption to the desorption process pressures, when measured at the end of adsorption and desorption, respectively.

The pilot plant consisted of two beds operating out of phase and with a cycle and steps similar to that described by Baksh et al. in U.S. Pat. No. 5,518,526, to be described in detail below. The performance results for production of $O_2$ at 90% purity are summarized in Table 2 below.

TABLE 2

| Test No. | Adsorbent | Pressure Ratio | Cyc. Times | bed ht m | $O_2$ Rec. % | BSF norm. | Power norm. |
|---|---|---|---|---|---|---|---|
| 1 | Z-0 | 5.3 | 45.0 | 1.0 | 71.5 | 1.0 | 1.0 |
| 2 | Z-0 | 3.4 | 33.0 | 1.0 | 60.5 | 0.97 | 0.97 |
| 3 | Z-2 | 5.0 | 41.5 | 1.0 | 74.5 | 0.78 | 0.99 |
| 4 | Z-2 | 3.1 | 24.5 | 1.0 | 58.5 | 0.78 | 0.91 |
| 5 | Z-2 | 2.6 | 20.5 | 1.0 | 51.0 | 0.92 | 0.88 |
| 6 | Z-2 | 3.3 | 25.0 | 0.9 | 60.0 | 0.76 | 0.90 |

The improvement in process performance achieved by substituting a high rate adsorbent Z-2 for adsorbent Z-0 can be evaluated from the results of Tests 1 and 3 for beds of 1.0 m depth. The product recovery increased from 71.5% to 74.5%, the specific power total process power/unit $O_2$ product) decreased by only about 1% and there was a large decrease (22%) in BSF for the process using Z-2 adsorbent. Bed size factor (BSF) and total process power have been normalized to the values obtained in Test 1.

The decrease in BSF occurs as a result of the combined effects of increased product recovery, decreased cycle time, the lower density of Z-2 (about 8% lower) compared to Z-0 and the higher throughput of feed gas that is possible with a high rate adsorbent.

The significant reduction in $O_2$ product recovery (71.5% to 60.5%) accompanying a reduction in pressure ratio from 5.3 to 3.4 is demonstrated by the results of Tests 1 and 2 for an advanced adsorbent with conventional diffusivity (Z-0). These tests were conducted with an adsorbent bed depth of approximately 1.0 m. The lower $N_2$ working capacity resulting from the lower pressure ratio necessitated the shorter cycle time. The BSF decreased slightly in contrast to the significant increases in BSF reported by Leavitt (U.S. Pat. No. 5,074,892). A modest decrease in power is also realized, but this is limited due to the large reduction in product recovery. Test 2 performance is representative of processes taught by Smolarek et al. (copending application Ser. No. 08/964293, now U.S. Pat. No. 6,010,555).

The same reduction in pressure ratio was imposed for the high rate adsorbent Z-2 between Tests 3 and 4. Here again, the reduction in $O_2$ product recovery is substantial (74.5% to 58.5%), although in this case the BSF remains unchanged due to the beneficial effects of the high-rate adsorbent. The ability to maintain the BSF as the pressure ratio decreases is the result of the much shorter cycle time that can be achieved with the adsorbent of higher intrinsic diffusivity. The penalty in $O_2$ product recovery as cycle time decreases is minimized by substituting the high-rate adsorbent as is evident by comparing the results of Test 2 with those of Test 4 in Table 2. The high intrinsic diffusiviy of adsorbent Z-2 also enabled the benefits of lower pressure ratio to be more fully exploited by reducing the power consumption of the process.

Comparing results from Test 1 and Test 4, a 9% reduction in specific power was achieved from the combination of low pressure ratio and high $N_2$ diffusivity. The 22% reduction in BSF for Test 4 (compared to Test 1) results from the combination of factors cited above in addition to the fact that the Z-2 adsorbent has approximately 12% higher $N_2$ working capacity compared to adsorbent Z-0 at a 3.1 pressure ratio. This working capacity difference results from the conversion of binder to zeolite in the caustic digestion process step. This higher $N_2$ working capacity will not necessarily occur in other treatment strategies used to achieve high intrinsic rate. Indeed, while advantageous, such higher working capacity is not essential to the practice of the basic invention.

Pressure ratio was reduced further from 3.1 to 2.6 for adsorbent Z-2. The results from Test 5 show that $O_2$ product recovery decreased to 51.0% (from 58.5% at a pressure ratio of 3.1 in Test 4), while BSF increased substantially and power continued to decrease compared to the results in Test 4. Here the potential benefits of lower pressure ratio are diminished due to the overwhelming reduction in product recovery, i.e. the pressure ratio has been reduced too much for this bed depth and adsorbent diffusivity. The use of an adsorbent with intrinsic diffusivity higher than that of adsorbent Z-2, e.g. adsorbent Z-1, would have preserved the desired simultaneous reduction of BSF and power at pressure ratios lower than 3.1. Nevertheless, the performance in Test 5 at a pressure ratio of 2.6 represents a substantial benefit in both power and BSF compared to the performance at the pressure ratio of 5.3 in Test 1.

The above results demonstrate the advantages of combining low pressure ratio with high adsorbent intrinsic diffusivity, while maintaining a constant bed depth. Cycle time was decreased only as much as necessary to compensate for the reduced $N_2$ working capacity of the adsorbent due to the lower pressure ratio. Low pressure ratio may be further exploited to gain additional performance advantage by employing faster cycles in shorter beds, i.e. provided the intrinsic diffusivity of the adsorbent is high enough.

Test 6 was performed with a bed depth of 0.9 m at the pressure ratio of 3.3. Surprisingly, the product recovery increased from 58.8% to 60.0% while BSF and power continued to decrease, i.e. compared to the results for Test 4 at about the same pressure ratio. These improvements derive from the faster cycle/shallower bed and are partially due to lower bed pressure drop and improved flow characteristics—the combination of which is enabled by the high-rate characteristics of the adsorbent.

The results of Table 2. are not intended to represent a complete definition of desirable conditions in terms of cycle time, bed depth and pressure ratio for adsorbent Z-2. Shorter beds and faster cycles may still produce additional advantages for this adsorbent at a pressure ratio of 3.3. Furthermore, lower pressure ratios (<3:1) can be combined with adsorbents of even higher intrinsic diffusivity (such as Z-1 in Table 1.) to achieve additional performance improvements over those obtained with adsorbent Z-2.

Thus, higher intrinsic diffusivity allows both improved performance at a fixed pressure ratio and/or extension to lower pressure ratios to achieve even lower product cost.

The substantial reductions in BSF and specific power consumption represented by the results of Tests 4, 5 and 6, using adsorbent Z-2, provide significant reduction in the cost of $O_2$ product—particularly when coupled with the simplifications in vacuum equipment (e.g. single-stage vacuum pump) possible at the lower pressure ratios. The possible higher cost of the adsorbent due to specialized processing to achieve the higher intrinsic diffusivity, is expected to be more than offset by the lower BSF. The lower product recovery experienced at lower pressure ratios results in higher air compression costs for a given plant capacity. These additional costs are more than offset by the savings in the cost of evacuation power and equipment at these lower pressure ratios due to the higher suction pressure in the process.

This invention represents a significant advance in air separation PSA performance in that processes represented by Tests 4 and 6 simultaneously achieve BSF <500 lb/TPDO and power consumption <7.5 kW/TPDO.

It is evident from the air separation examples above that minimum product cost can be achieved by tailoring the pressure ratio, cycle time and bed depth for a specific intrinsic diffusivity. The best combination of conditions will vary for adsorbents with different intrinsic diffusivities. Furthermore, this invention may be applied to other gas separations to affect lower product costs through lower power consumption by implementing lower pressure ratios. Thus, the exact combination of process conditions for minimum cost depends upon the adsorbent properties and the separation of interest.

For PSA air separation, the preferred pressure ratio range is from about 2.0 to 5.0 for adsorbents with an intrinsic $N_2$ diffusivity equal to or greater than $3.5 \times 10^{-6}$ m$^2$/s. A more preferred range of pressure ratios is 1.5 to 3.5 for adsorbents with a diffusivity equal to or greater than $4.5 \times 10^{-6}$ m$^2$/s.

VPSA Process/System Description

Figure 2:
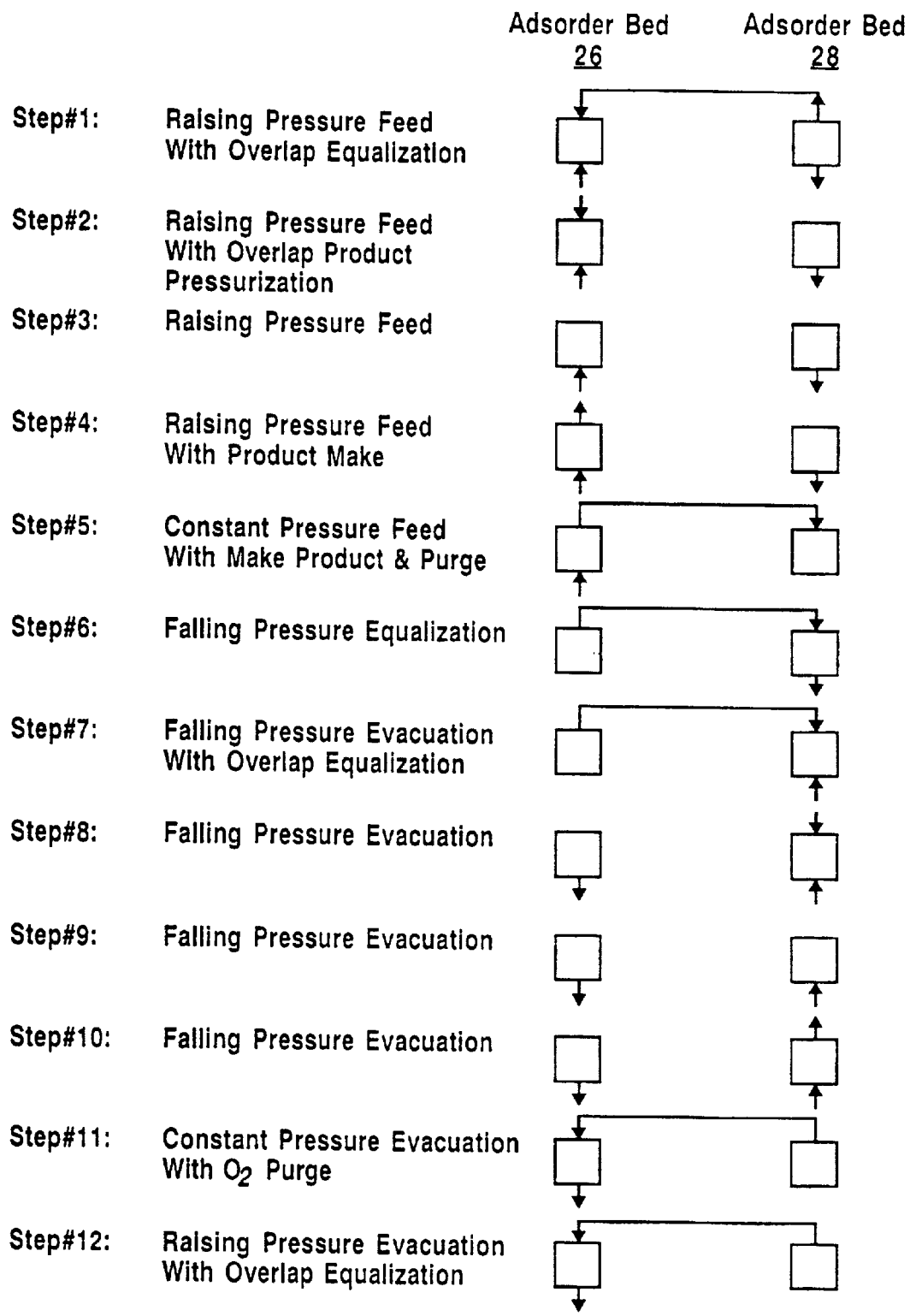
FIG. 2 is a schematic showing one possible set of cycle steps for carrying out the invention.

Referring now to FIGS. 1 and 2, the operation of a VPSA system in accordance with the invention will be described. Referring to FIG. 1, a VPSA system 10 includes a feed air inlet 12 that enables feed air to enter through inlet filter 14 and inlet silencer 16. Feed air blower 18 compresses the air for delivery to the system via discharge silencer 20 and conduit 22. During periods of unload, the feed blower is vented via valve 24.

Air enters adsorbers 26 and 28 via conduit 30 and open valves 32 and 34. Waste $N_2$ and contaminants are removed from the adsorbers via opened valves 38 and 40, conduits 36, conduit 42 and vacuum pump 44. Waste gas is silenced before venting by silencer 46. During periods of unload, vacuum pump 44 is recirculated through open valve 48.

Product reflux steps and product make is accomplished via conduit 50 and valves 52 and 54. Product make is conducted through conduit 56 and valve 58. Final product storage is contained within surge tank 60 and delivered to use point 62 via valve 64 and conduit 66. Each of adsorber beds 26 and 28 includes a high rate adsorbent that is selective for $N_2$, assuming that VPSA system is to be used for $O_2$ production.

The process steps performed by VPSA System 10 during implementation of the invention will be described in conjunction with the process step diagram shown in FIG. 2. Table 3 indicates the elapsed cycle time, start pressure and end pressure for each step of the representative cycle. One skilled in the art will recognize that the essential elements of the invention can be practiced using other cycle configurations. For the purpose of the cycle description below, the "bottom" of the vessel means the feed inlet while the "top" of the vessel is the product withdrawal point. Note that while adsorber bed 26 undergoes steps 1–6, adsorber bed 28 undergoes steps 7–12.

TABLE 3

SINGLE STAGE CYCLE

| Step description | Step time seconds | Start Pressure psia | End Pressure psia |
|---|---|---|---|
| *Step #1 Raising pressure feed with overlap equalization | 2.0 | 8.0 | 14.5 |
| Step #2 Raising pressure feed with overlap product pressurization | 2.0 | 14.5 | 19.0 |
| Step #3 Raising pressure feed | 2.0 | 19.0 | 22.0 |
| Step #4 Constant pressure feed with Make-product | 2.0 | 22.0 | 23.0 |
| Step #5 Constant pressure feed with Make-product and purge | 4.0 | 23.0 | 23.0 |
| Step #6 Falling pressure equalization | 2.0 | 23.0 | 19.0 |
| half cycle | | | |
| Step #7 Falling pressure evacuation with overlap equalization | 2.0 | 19.0 | 13.0 |
| Steps #8 & #9 & #10 Falling pressure evacuation | 6.0 | 13.0 | 7.0 |
| Step #11 Constant pressure evacuation with Oxygen purge | 4.0 | 7.0 | 7.0 |
| Step #12 Raising pressure evacuation with overlap equalization | 2.0 | 7.0 | 8.0 |

Hereafter further details are given of each of the steps listed in Table 3 and illustrated in FIG. 2.

Step #1
Raising Pressure Feed with Overlap Equalization:
 This step initiates the feed air pressurization period. Air is fed to the bottom of adsorber bed 26 (for example) from compressor 18 and via conduit 22. The pressure raises rapidly within adsorber bed 26 from about 8.0 psia to about 14.5 psia. The step is 2 seconds in duration. Oxygen-rich equalization gas is simultaneously introduced into the top of adsorber bed 26 from adsorber bed 28 during this step.

Step #2
Raising Pressure Feed with Overlap Product Pressurization:
 This step continues the feed air pressurization period. Air is fed to the bottom of adsorber bed 26 from compressor 18. The pressure continues to rise during this step from 14.5 psia to about 19.0 psia, the step is 2 seconds in duration. Oxygen repressurization gas taken from the product surge tank 60 is simultaneously introduced into the top of adsorber bed 26 during this step.

Step #3
Raising Pressure Feed:
 Feed air only is introduced into adsorber bed 26 and the top of the vessel is closed. The pressure rises from 19.0 to about 22.0 psia during this 2 second step. Feed air is supplied by compressor 18 during this step.

Steps #4–#5
Constant Pressure Feed with Make-product:
 Feed air is introduced into the bottom of adsorber bed 26 while oxygen product is removed from the top. The pressure remains relatively constant during this 6 second period at 22.0 to 23.0 psia. The feed air is supplied by compressor 18. The oxygen product is supplied to oxygen surge tank 60 as well as to adsorber bed 28 as oxygen purge during step 5. The purity of the oxygen product remains relatively constant (90%) during the product make steps.

Step #6
Falling Pressure Equalization:
 The residual oxygen product at the top of adsorber bed 26 is withdrawn during this step from the top of the vessel. There is no flow from the bottom of adsorber bed 26. The vessel pressure falls from 23.0 to about 19.0 psia during this 2 second step. Compressor 18 is vented during this step.

Step #7
Falling Pressure Evacuation with Overlap Equalization:
 Valve 38 is opened and waste nitrogen is removed from the bottom of adsorber bed 26 through vacuum pump 44. The pressure falls from 19.0 psia to about 13.0 psia during this 2 second step. The oxygen concentration starts at about air purity and falls rapidly. The equalization falling step continues as the oxygen-rich gas is removed from the top of adsorber bed 26.

Steps #8–#10
Falling Pressure Evacuation:
 Waste nitrogen is removed from the bottom of adsorber bed 26 through the vacuum pump 44. The pressure falls from 13.0 psia to about 7.0 psia during this 6 second period. The top end of adsorber bed 26 is closed during this step. The oxygen concentration in the waste gas reaches its minimum at the end of step 10.

Step #11
Constant Pressure Evacuation with Oxygen Purge:
 The minimum evacuation pressure is reached and oxygen purge is introduced to the top of adsorber 26. The pressure remains constant during this 4 second step at 7.0 psia due to the matching of the purge flow to the evacuation flow.

Step #12
Raising Pressure Evacuation with Overlap Equalization:
 Vacuum pump 44 continues to remove waste gas from the bottom of adsorber bed 26 while oxygen equalization gas is added to the top thereof. The pressure rises during this step because the oxygen equalization flow is larger than the evacuation flow. The pressure raises from 7.0 to about 8.0 psia during the 2 second step.

The cycle described above is illustrative only, and the essential features of the invention can be practiced using other adsorptive cycles.

Figure 3:
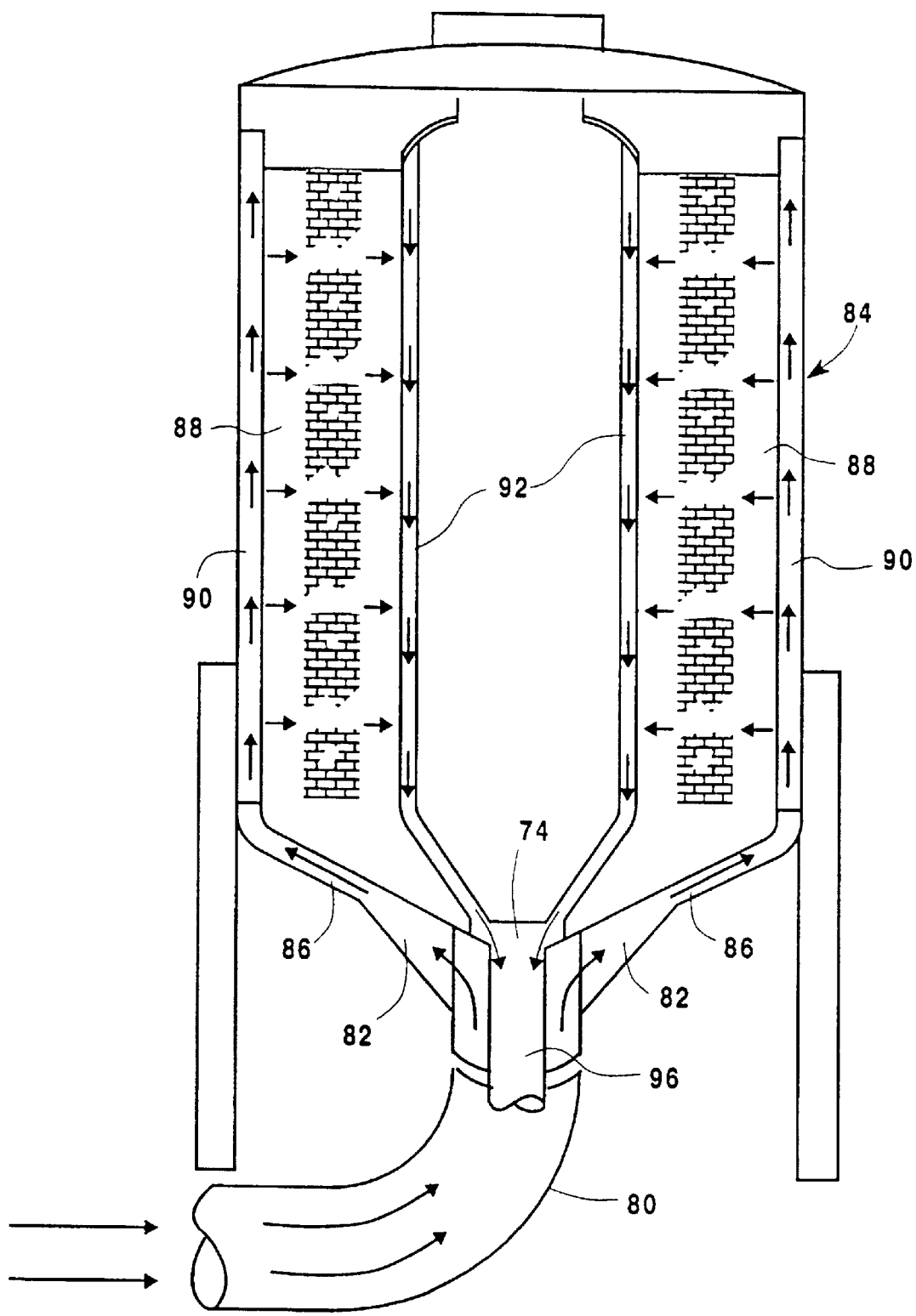
FIG. 3 is a cross sectional view of a radial bed adsorber that is particularly adapted to use with the invention.

Radial Bed Configuration:
 The VPSA method of the invention is particularly suited to use with a radial bed structure due to the low pressure ratios that are employed. Such a radial bed configuration is shown in FIG. 3. Feed and waste gas is supplied through a conduit 80 to a radial flow distribution assembly 82 where the inlet gas flows to the outside walls of vessel 84.

The gas, which now is uniformly distributed in the lower head 86, is supplied to adsorption bed 88 via outside vertical flow paths 90, flowing upwardly through straight or tapered flow passages. The gas then flows through adsorber bed 88 in an inward radial manner. The gas exiting at the product end of adsorber bed 88 is collected inside vertical flow paths 92 and flows downward. The product gas is collected in a conical collection assembly 74 at the bottom of vessel 84. The collected product gas exits the vessel through conduit 96, contained within feed conduit 80. Alternatively, conduit 96 may be oriented such that the product gas is withdrawn at the top of the vessel in FIG. 3.

Vessel flow distribution is critical to successful operation of a VPSA process and a major contributor to flow distribution is the channel pressure differential between the feed and product ends of the adsorber. This pressure differential is a combination of frictional pressure losses and velocity-head changes in the flowing gases. These two effects tend to cancel when flow is entering a channel, and are additive when flow is exiting a channel. The degree of cancellation and addition is affected by the internal geometry of the chamber, i.e. through design of tapered channels. All VPSA processes by nature reverse the gas flow direction periodically to accomplish the subsequent adsorption and desorption process steps.

SUMMARY

The main features of the invention are as follows:
1) low pressure ratio combined with an adsorbent of high pore diffusivity;
2) low pressure ratio combined with an adsorbent of high pore diffusivity, such that BSF <500 lb/TPDO and total power <7.5 kW/TPDO, more preferably such that BSF <300 lb/TPDO and total power <7.0 kW/TPDO;
3) shallow beds combined with 1) above, followed by shallow beds and shorter cycles combined with 1) above, and with increasingly preferred combinations of bed depth/cycle time of <1.2 m/<40s, <0.9 m/<30s and <0.6 m/ <20s;
4) single stage vacuum device combined with 1) above;
5) radial flow adsorber vessel combined with 1) or with 4) above;
6) a pressure drop across the adsorbent bed not exceeding 1.5 psi in desorption and adsorption is preferred, and a pressure drop across the adsorbent bed not exceeding 1.0 psi in desorption and adsorption is most preferred in combination with 1) above;
7) particle size tailored to the intrinsic diffusivity to maximize mass transfer rate without suffering significant increase in pressure drop combined with 1) above, the most preferred particle size range is for an average particle diameter of about 0.8 mm to about 1.6 mm;

8) adsorbents with enhanced capacity and/or selectivity combined with 1) above.

The fundamental object of the invention is to reduce product cost by combining adsorbents with high intrinsic diffusivity with low pressure ratios in PSA processes. The invention is directed at equilibrium-based adsorption separation processes with mass transport dominated by intraparticle pore diffusion.

While the examples have been directed at air separation using a single main adsorbent, the invention is not limited to binary mixtures, nor to air as a feed nor to a single main adsorbent. When more than a single separation is to be achieved, it is feasible to include one or more adsorbents as main adsorbents—each adsorbent responsible for a different separation or a different level of the same separation. Thus, the properties (particularly those related to the rate of adsorption) of the different adsorbent materials in the main adsorbent zone are selected to maximize all of the separations required of the process. Examples of such processes include the recovery of $H_2$ from $H_2/CO/CO_2/CH_4$ mixtures, the removal of $H_2O$ and $CO_2$ from air, separation of Ar from air or $N_2$ or $O_2$, drying of process streams and the recovery of $CO_2$ from flue gases or from $H_2$ PSA tail gas.

The invention may be applied to adsorption processes intended to recover either the light or the heavy product or both. In all cases, the pore diffusivities of the key adsorbates are to be maximized. The benefits of low pressure ratio are likely to be greatest in bulk separations in which the heavy component is also the major component of the feed gas, particularly in processes incorporating vacuum desorption. Appropriate matching of desorption pressures to suction pressures of existing vacuum equipment provides a means of simplifying and reducing the cost of the equipment, e.g. by reducing the number of compression stages, eliminating aftercooling, etc.

Air separation using $N_2$-selective adsorbents is a prime example where lower pressure ratio represents a substantial potential reduction in power consumption.

Type X zeolite adsorbents are suggested for air separation, most preferably highly-exchanged LiX as described by Chao (cited above). Type X, type A, and naturally occurring zeolites containing monovalent, multivalent or mixed cations are also applicable to the present invention when appropriately produced to achieve high intrinsic pore diffusivity.

It should also be clear that the present invention may be practiced with various deployments of adsorbents in the main adsorbent zone, e.g. layers and mixtures of adsorbents of various types or of the same type but with varying adsorption and/or physical characteristics. For example, the low pressure ratio/high diffusivity concepts of this invention can be applied to the layered beds suggested by Ackley in copending U.S. patent application Ser. No. 837,411, now U.S. Pat. No. 6,152,991. While the invention has been described for adsorbent zones consisting of a fixed bed of adsorbent particles, the invention may be practiced using alternative adsorbent deployment configurations, e.g., monoliths, adsorbent agglomerates dispersed on a fibrous substrate, etc.

Additional improvements may be achieved by appropriate selection of adsorbent particle size in conjunction with the adsorbent intrinsic diffusivity and combining in a low pressure ratio cycle. For air separation and for the preferred pressure ratio ranges and $N_2$ intrinsic diffusivities noted above, the preferred average particle size (diameter) is between 0.8 mm and 1.6 mm.

This latter issue can be addressed best using radial flow, where the flexibility in selecting flow area, bed depth and flow distribution is greatest in regard to controlling pressure drop at acceptable levels. Radial flow adsorbers provide inherent constraint of the adsorbent such that fluidization can be avoided when using small particles.

This invention applies generally to a full range of cycle steps and process conditions, e.g. temperatures, pressures, feed velocity, etc. Likewise, its concepts can be applied to single-bed as well as multi-bed processes operating with subatmospheric (VSA), transatmospheric (VPSA) or superatmospheric (PSA) cycles. The concepts described here are not limited to any particular adsorber configuration and can be effectively applied to axial flow, radial flow, lateral flow, etc. adsorbers. The adsorbent may be constrained or unconstrained within the adsorber vessel.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A pressure swing adsorption method comprising repetitions of a cycle of N steps, said method adapted to separate components of a gas mixture into at least a first component and a second component by selective adsorption of said first component into a bed of adsorbent, said method comprising the steps of:
   a) during adsorption steps of a cycle, raising a pressure of a feed of said gas to said bed to an adsorption pressure so as to enable adsorption of said first component by said adsorbent, said adsorbent exhibiting an intrinsic diffusivity for said first component that is equal to or greater than $3.5 \times 10^{-6}$ m$^2$/sec;
   b) during desorption steps of said cycle, depressurizing said bed to a desorption pressure so as to desorb said first component from said adsorbent, a ratio of pressures of said adsorption pressure to said desorption pressure falling within a range of less than about 5.0.

2. The pressure swing adsorption method as recited in claim 1, wherein said ratio of pressures falls within a more preferred range of about 3.5 to 5.

3. The pressure swing adsorption method as recited in claim 1, wherein said intrinsic diffusivity of said adsorbent for said first component is equal to or greater than $4.0 \times 10^{-6}$ m$^2$/sec and said ratio of pressures falls within a range of about 1.5 to 3.5.

4. The pressure swing adsorption method as recited in claim 3, wherein a lowest pressure during a cycle is within 6 to 9 psia and a highest pressure during said cycle is within about 18 to 24 psia.

5. The pressure swing adsorption method as recited in claim 3, wherein said gas is air, said first component is nitrogen and said second component is oxygen.

6. The pressure swing adsorption method as recited in claim 1, wherein said adsorbent is a particulate and has an average particle diameter between 0.8 mm and about 1.6 mm.

7. The pressure swing adsorption method as recited in claim 1, wherein said adsorbent is a type X zeolite with a $SiO_2/Al_2O_3$ ratio less than or equal to 2.5 and exchanged with Li (>70%).

8. The pressure swing adsorption method as recited in claim 1, wherein said bed of adsorbent has a dimension, in a direction of flow of said gas through said bed of adsorbent, of less than about 1.2 m and said method performs steps a) and b) in a time of less than about 40 seconds.

9. The pressure swing adsorption method as recited in claim 1, wherein said bed of adsorbent has a dimension, in a direction of flow of said gas through said bed of adsorbent, of less than about 0.9 m and said method performs steps a) and b) in a time of less than about 30 seconds.

10. The pressure swing adsorption method as recited in claim 1, wherein said bed of adsorbent has a dimension, in a direction of flow of said gas through said bed of adsorbent, of less than about 0.6 m and said method performs steps a) and b) in a time of less than about 20 seconds.

11. A pressure swing adsorption system for performing a gas separation method comprising repetitions of a cycle of N steps, said separation method for separating components of a gas mixture into at least a first component and a second component by selective adsorption of said first component into a bed of adsorbent particles, said system comprising:

an adsorbent that is selective for said first component, said adsorbent exhibiting an intrinsic diffusivity for said first component that is equal to or greater than $3.5 \times 10^{-6}$ m$^2$/sec, said system exhibiting both a reduction in bed size factor (BSF) and specific power consumption relative to a pressure swing adsorption system incorporating adsorbents of lower intrinsic diffusivity; and control means for controlling a ratio of adsorption pressure to desorption pressure across said bed within a range of less than about 5.0.

12. The system as recited in claim 11 wherein said control means controls said ratio to fall within a more range of about 3.5 to 5.

13. The system as recited in claim 11, wherein said control means controls a pressure drop across said bed during said method so as to not exceed about 1.0 psi during desorption and during adsorption.

14. The system as recited in claim 11, wherein said control means controls a pressure drop across said bed during said method so as to not exceed about 1.5 psi during desorption and during adsorption.

15. The system as recited in claim 11, wherein said intrinsic diffusivity of said adsorbent particles for said first component is equal to or greater than $4.5 \times 10^{-6}$ m$^2$/sec and said control means controls said ratio to fall within a preferred range of about 1.5 to 3.5.

16. The system as recited in claim 11, wherein said bed is arranged in a radial annular configuration, and said gas mixture exhibits a flow pattern that is transverse to said annular configuration.

17. The system as recited in claim 16, further comprising:

a single stage vacuum pump coupled to said bed for withdrawing an adsorbed component from said bed during a desorption phase of said gas separation method.

18. The system as recited in claim 11, wherein said gas is air, said first component is nitrogen and said second component is oxygen.

19. The system as recited in claim 18, wherein the system exhibits a bed size factor <500 lb/TPDO and a specific power consumption <7.5 kW/TPDO.

20. The system as recited in claim 11, wherein said each of said adsorbent particles is a particulate and has an average particle diameter of about 0.8 mm and about 1.6 mm.

21. The system as recited in claim 11, wherein said adsorbent is a type X zeolite with a $SiO_2/Al_2O_3$ ratio less than or equal to 2.5 and exchanged with Li (>70%).

22. The system as recited in claim 11, wherein said bed of adsorbent has a dimension, in a direction of flow of said gas through said bed of adsorbent, of less than about 1.2 m and said control means controls said system to perform adsorption and desorption steps in a time of less than about 40 seconds.

23. The system as recited in claim 11, wherein said bed of adsorbent has a dimension, in a direction of flow of said gas through said bed of adsorbent, of less than about 0.9 m and said control means controls said system to perform adsorption and desorption steps in a time of less than about 30 seconds.

24. The system as recited in claim 11, wherein said bed of adsorbent has a dimension, in a direction of flow of said gas through said bed of adsorbent, of less than about 0.6 m and said control means controls said system to perform adsorption and desorption steps in a time of less than about 20 seconds.

* * * * *